(12) United States Patent
Hung et al.

(10) Patent No.: US 8,275,983 B2
(45) Date of Patent: Sep. 25, 2012

(54) FILE UPDATING METHOD BY REPLACING AT LEAST ONE SHORTCUT IN SYSTEM PARTITION

(75) Inventors: Liang-Mao Hung, Taipei Hsien (TW);
Chih-Yuan Chuang, Taipei Hsien (TW);
Chia-Hung Chien, Taipei Hsien (TW);
Peng-Zheng Yang, Taipei Hsien (TW);
Chun-Wen Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 320 days.

(21) Appl. No.: 12/610,379

(22) Filed: Nov. 2, 2009

(65) Prior Publication Data
US 2010/0312949 A1   Dec. 9, 2010

(30) Foreign Application Priority Data

Jun. 8, 2009   (CN) .......................... 2009 1 0303029

(51) Int. Cl.
*G06F 13/00*   (2006.01)
(52) U.S. Cl. ................ 713/1; 713/2; 713/100; 711/173; 711/170; 711/2; 715/700
(58) Field of Classification Search .................. 711/173, 711/170, 2; 715/700; 713/1, 2, 100
See application file for complete search history.

(56) References Cited

U.S. PATENT DOCUMENTS

| 5,268,928 A | * | 12/1993 | Herh et al. ..................... 375/222 |
| 6,079,016 A | * | 6/2000 | Park ................................. 713/2 |
| 6,418,541 B1 | * | 7/2002 | Jeon ................................ 714/36 |
| 6,983,344 B2 | * | 1/2006 | Taylor .......................... 711/103 |
| 7,360,073 B1 | * | 4/2008 | Billstrom et al. ................. 713/2 |
| 2001/0052068 A1 | * | 12/2001 | Kubota ............................ 713/2 |
| 2004/0172578 A1 | * | 9/2004 | Chen et al. ..................... 714/15 |
| 2006/0129537 A1 | * | 6/2006 | Torii et al. ........................ 707/3 |
| 2008/0046997 A1 | * | 2/2008 | Wang ............................. 726/16 |
| 2009/0043984 A1 | * | 2/2009 | Chang et al. .................. 711/173 |
| 2009/0307477 A1 | * | 12/2009 | Matthew et al. .................. 713/2 |

\* cited by examiner

*Primary Examiner* — Hong Kim
(74) *Attorney, Agent, or Firm* — Altis Law Group, Inc.

(57) ABSTRACT

A method for storing files in a storage device includes the following steps. The storage device is divided into an original partition and a system partition. A plurality of original files is installed in the original partition. A shortcut is established in the system partition pointing to a first original file of the original files. The first original file can be executed by activating the shortcut.

4 Claims, 8 Drawing Sheets

FILE UPDATING METHOD BY REPLACING AT LEAST ONE SHORTCUT IN SYSTEM PARTITION

BACKGROUND

1. Technical Field

The disclosure generally relates to methods for managing files in storage devices.

2. Description of Related Art

Conventional electronic devices, such as digital cameras, set-top boxes, digital phone frames etc. usually have at least one backup copies of system data in their disk storages. So these backup copies may be used to restore the original data after a data loss event. However, storage space of most electronic device is usually limited and the backup files will occupy a large part of the available storage. Additionally, the electronic device may need to be updated to enhance some functions and the update files will occupy more storage. So the system files storage space will be further reduced.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
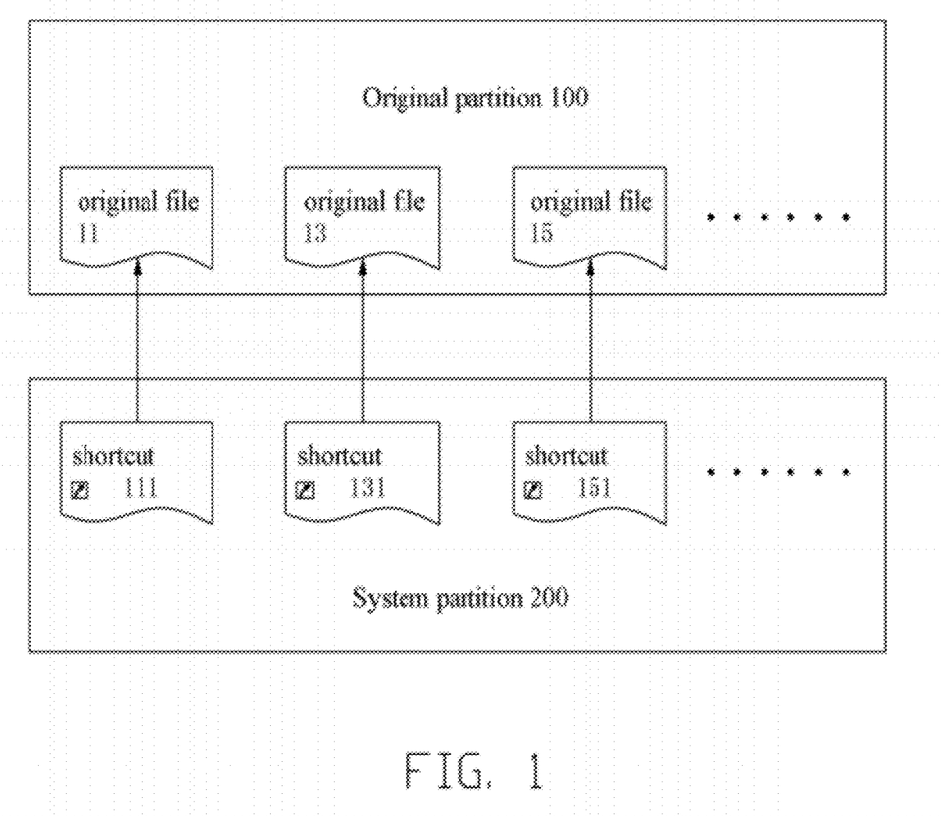
FIG. 1 is a block view showing a linking relationship between an original partition and a system partition according to a first embodiment.

Referring to FIG. 1, a storage device is used in an electronic device with an embedded system. The storage device may be a flash memory. The storage device is divided into an original partition 100 and a system partition 200 in a first embodiment. The original partition 100 has the same size as the system partition 200. The original partition 100 stores a plurality of original files. The original files include an original file 11, an original file 13, and an original file 15. All the original files in the original partition 100 will be kept the same as backup for use to restore the electronic device original condition if needed or desired. The original files in the original partition can only be invoked and cannot be changed. The system partition 200 stores a plurality of shortcuts pointing to the original files. The shortcuts include a shortcut 111 pointing to the original file 11, a shortcut 131 pointing to the original file 13, and a shortcut 151 pointing to the original file 15. To better manage space of the storage device original files such as for an application of the electronic device are stored in the original partition 100 and shortcuts in the system partition 200 are formed to point to the original files. So the electronic device can execute the shortcuts in the system partition 200 to invoke the files in the original partition 100 original partition. The shortcut is a small file containing target URI or the name of a target program file that the shortcut represents. Due to small sizes of the shortcuts, the size of the system partition 200 is saved. The original partition 100 is a non-boot partition by default, and the system partition 200 is a boot partition by default. The boot partition is executed by the electronic device by default when the electronic device is powered up, and other partitions in the electronic device are non-boot partitions.

Figure 2:
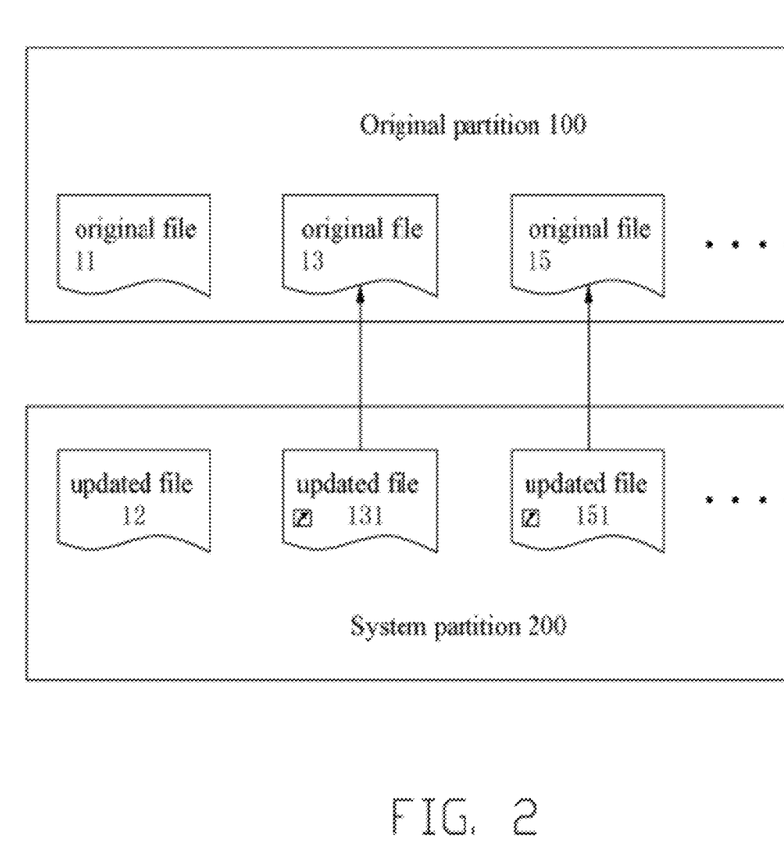
FIG. 2 is similar to FIG. 1, but showing a first shortcut is updated.
Figure 3:
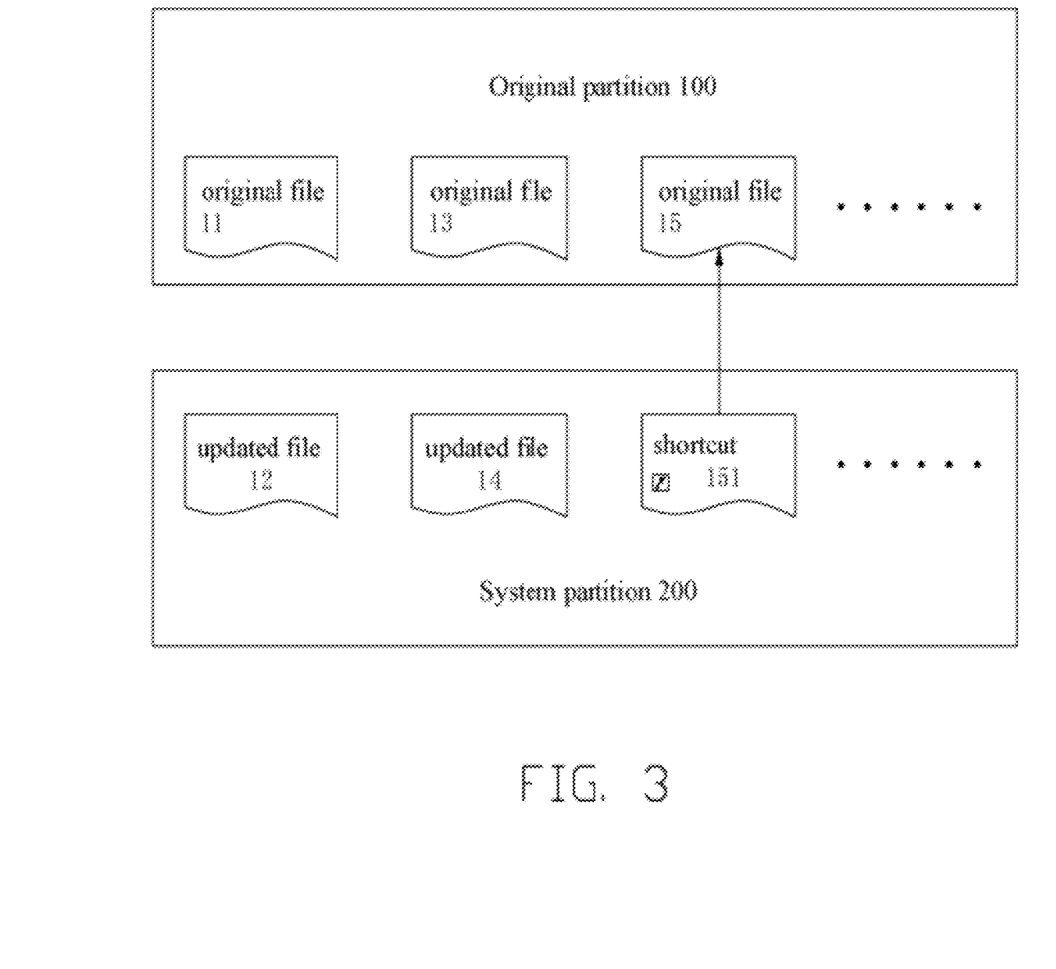
FIG. 3 is similar to FIG. 2, but showing a second shortcut is updated.
Figure 4:
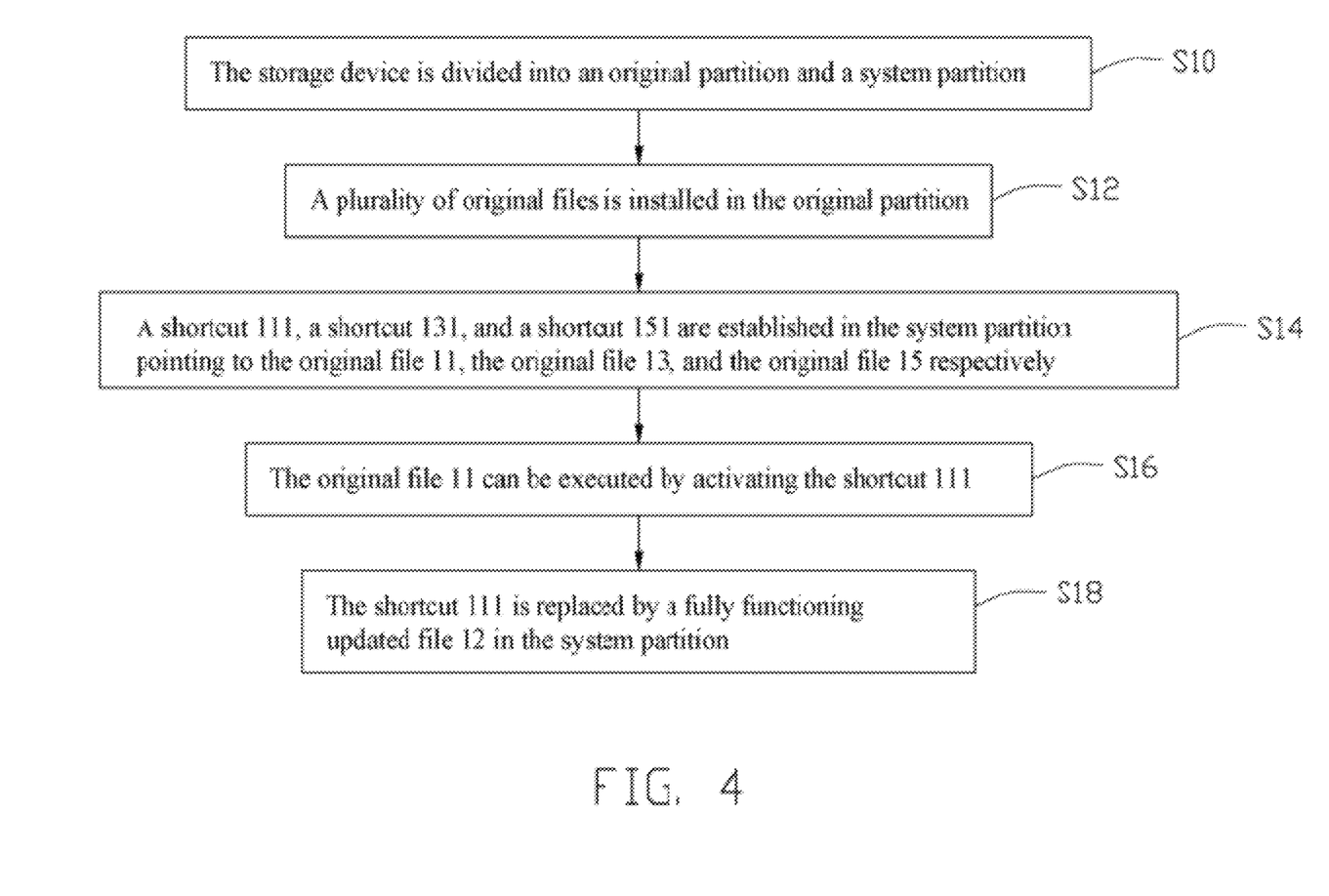
FIG. 4 is a flowchart of a method for storing files in a storage device according to the first embodiment.

Referring to FIG. 2-4, a method for storing files in the electronic device according to the first embodiment includes the following steps.

In step 10, the storage device is divided into an original partition 100 and a system partition 200.

In step 12, a plurality of original files is installed in the original partition 100. The original files include an original file 11, an original file 13, and an original file 15.

In step 14, a shortcut 111, a shortcut 131, and a shortcut 151 are established in the system partition 200 pointing to the original file 11, the original file 13, and the original file 15 respectively.

In step 16, the original file 11 can be executed by activating the shortcut 111. In this way, only the shortcuts with small size relative to the original files are stored in the system partition 200. Space in the system partition 200 is saved for use to receive updated files.

In step 18, when it is needed to update an application rather than add more files to the original partition 100, the shortcut 111 is replaced by a fully functioning updated file 12 in the system partition 200. The original files are left alone for use to restore to the electronic device to original settings if needed. So, when update is finished, the electronic device can execute the original shortcuts and execute the updated file 12 directly in the system partition 200.

Figure 5:
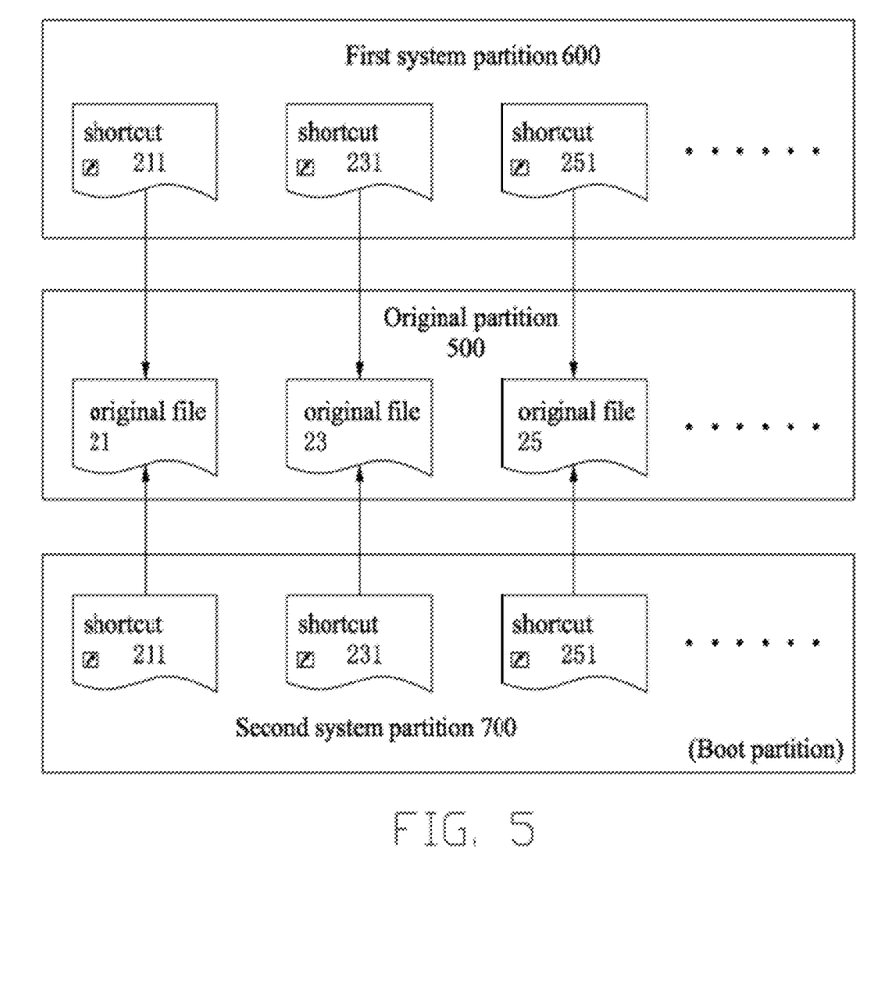
FIG. 5 is a block view showing a linking relationship between an original partition and a first system partition, and between the original partition and a second system partition according to a second embodiment.

Referring to FIG. 5, the storage device is divided into an original partition 500 and a first system partition 600 and a second system partition 700 in a second embodiment all of equal size. The original partition 500 stores a plurality of original files. The original files include an original file 21, an original file 23, and an original file 25. The first system partition 600 and the second system partition 700 respectively store a plurality of shortcuts corresponding to the original files. The shortcuts include a shortcut 211 pointing to the original file 21, a shortcut 231 pointing to the original file 23, and a shortcut 251 pointing to the original file 25. The original partition 500 and the first system partition 600 are non-boot partitions by default, and the second system partition 700 is a boot partition by default. When the boot partition is changed, only one of the first system partition 600 and the second system partition 700 is the boot partition at any one time.

Figure 6:
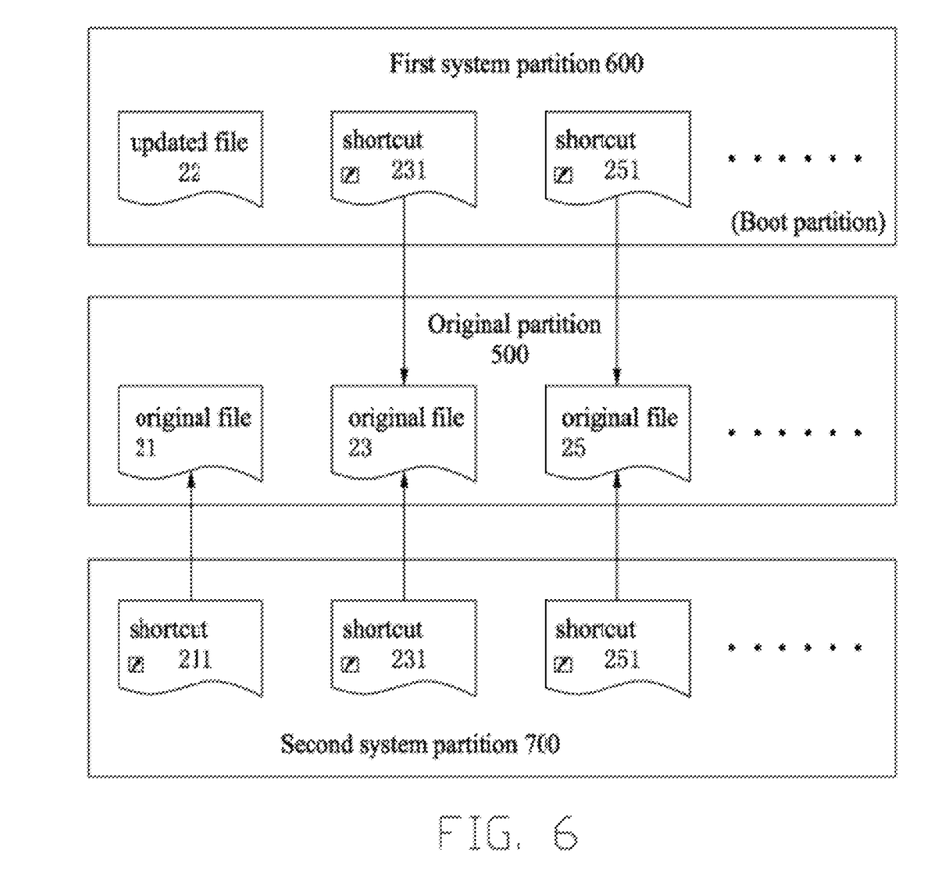
FIG. 6 is similar to FIG. 5, but showing a first shortcut in the first system partition is updated.
Figure 7:
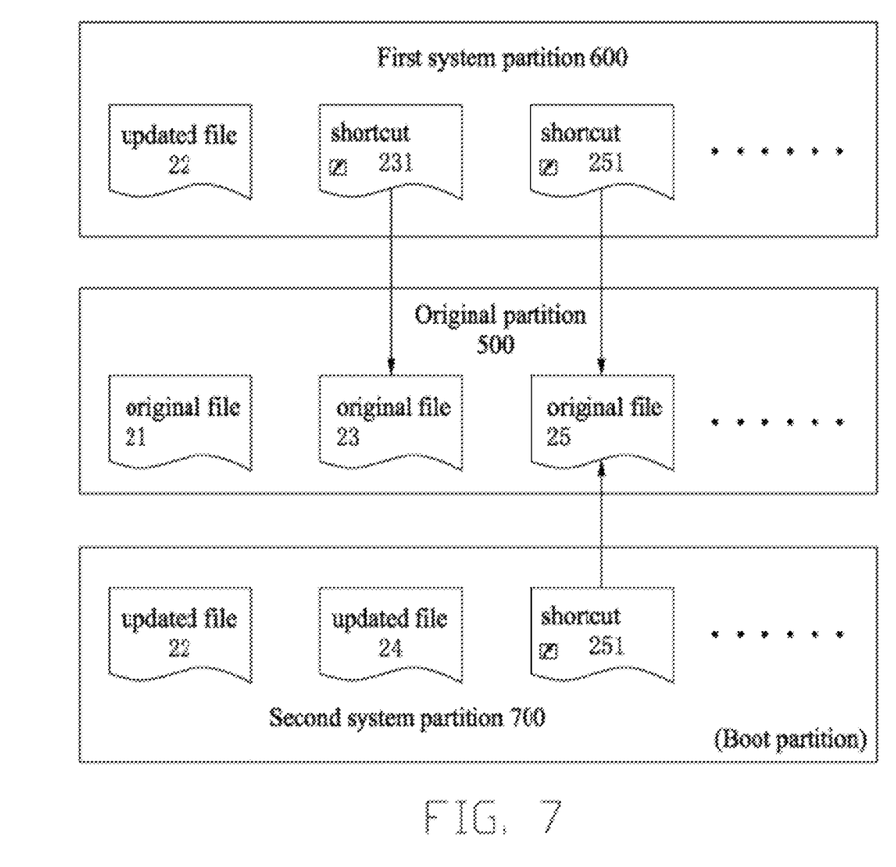
FIG. 7 is similar to FIG. 6, but showing a first shortcut and a second shortcut in the second application are updated.
Figure 8:
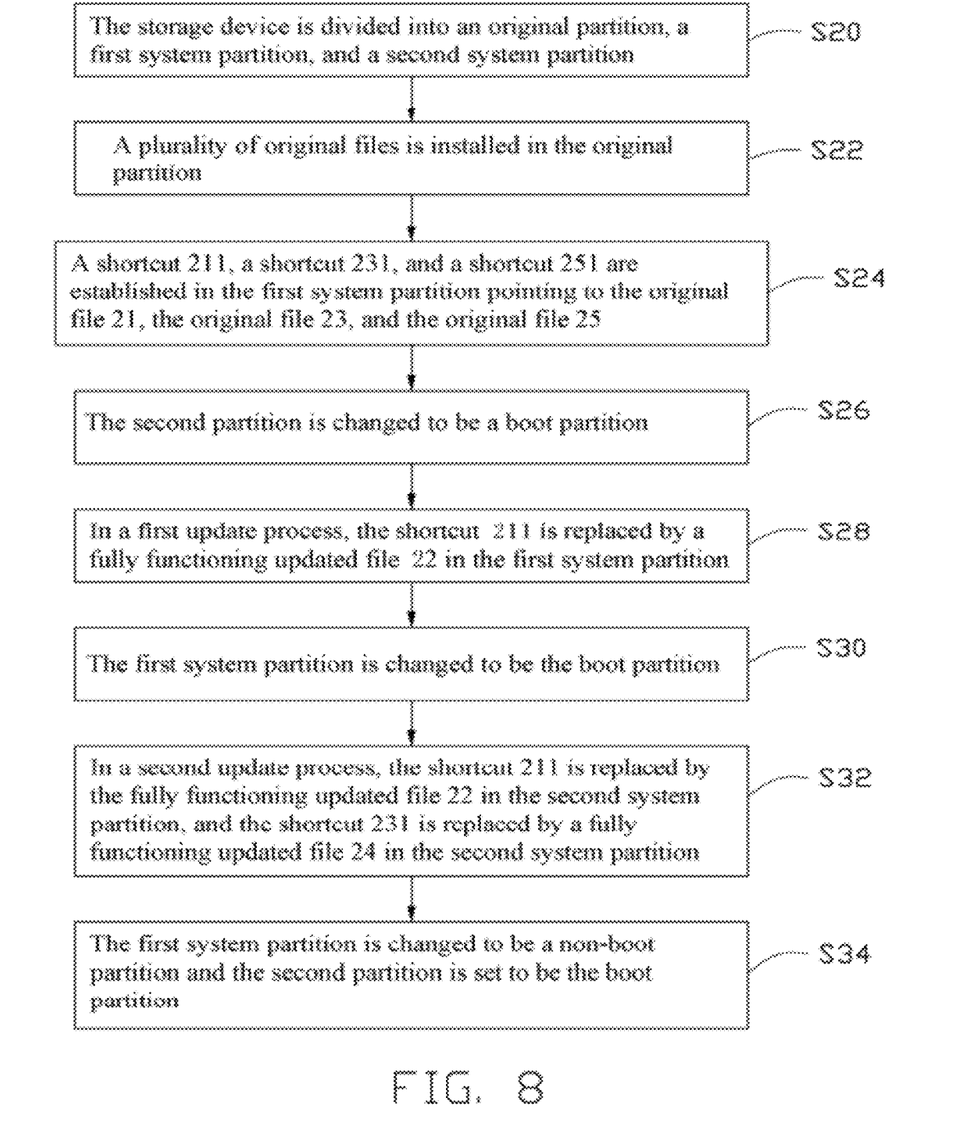
FIG. 8 is a flowchart of a method for storing files in a storage device according to the second embodiment.

Referring to FIG. 6-8, a method for storing files in the electronic device according to the second embodiment includes the following steps.

In step 20, the storage device is divided into an original partition 500, a first system partition 600, and a second system partition 700.

In step 22, a plurality of original files is installed in the original partition 500. The original files include an original file 21, an original file 23, and an original file 25.

In step 24, a shortcut 211, a shortcut 231, and a shortcut 251 are established in the first system partition 600 pointing to the original file 21, the original file 23, and the original file 25. The second system partition 700 also has the shortcut 211, the shortcut 231, and the shortcut 251 pointing to the original file 21, the original file 23 and the original file 25.

In step 26, the second partition is changed to be a boot partition.

In step 28, in a first update process, the shortcut 211 is replaced by a fully functioning updated file 22 in the first system partition 600.

In step 30, the first system partition 600 is changed to be the boot partition.

In step 32, in a second update process, the shortcut 211 is replaced by the fully functioning updated file 22 in the second system partition 700, and the shortcut 231 is replaced by a fully functioning updated file 24 in the second system partition 700.

In step 34, the first system partition 600 is changed to be a non-boot partition, and the second partition 700 is set to be the boot partition.

The advantage is that by not updating the original files or adding new files to the original partition 100, the space for system partition 200 is used more efficiently. And the new updated files can be used where the shortcuts were originally kept in the system partition and changed or updated as needed without interfering with the original partition.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for storing files in a storage device, the method comprising:
    dividing the storage device into an original partition, a first system partition and a second system partition;
    installing a plurality of original files in the original partition;
    establishing a first shortcut in each of the first system partition and the second system partition, the first shortcut pointing to a first original file of the plurality of original files;
    setting the second system partition to be a boot partition;
    replacing the first shortcut in the first system partition with a first updated file without writing files to the original partition; and
    setting the second system partition to be a non-boot partition, and setting the first system partition to be the boot partition;
    establishing a second shortcut in each of the first system partition and the second system partition, the second shortcut respectively pointing to a second original file of the plurality of original files;
    replacing the first shortcut in the second system partition with the first updated file and replacing the second shortcut in the second system partition with a second updated file; and
    setting the second system partition to be the boot partition.

2. The method of claim 1, wherein the storage device is used in an electronic device with an embedded system.

3. The method of claim 1, wherein the storage device is a flash memory.

4. The method of claim 1, wherein the original partition has a size same as a size of the first system partition.

* * * * *